(12) United States Patent
Kriechbaum et al.

(10) Patent No.: US 7,003,090 B2
(45) Date of Patent: Feb. 21, 2006

(54) METHOD OF ESTABLISHING A COMMUNICATION CHANNEL TO INTELLIGENT SUPPORT FOR EBUSINESS APPLICATIONS

(75) Inventors: Werner Kriechbaum, Ammerbuch-Beitenholz (DE); Ronald Pfeifer, Nufringen (DE); Gerhard Stenzel, Herrenberg (DE)

(73) Assignee: International Business Machines Corporation, Armonk, NY (US)

( * ) Notice: Subject to any disclaimer, the term of this patent is extended or adjusted under 35 U.S.C. 154(b) by 626 days.

(21) Appl. No.: 10/138,435

(22) Filed: May 3, 2002

(65) Prior Publication Data

US 2003/0043991 A1 Mar. 6, 2003

(30) Foreign Application Priority Data

Aug. 28, 2001 (EP) .................................. 01120447

(51) Int. Cl.
*G06F 15/16* (2006.01)
*H04L 12/28* (2006.01)
*H04L 12/66* (2006.01)
*H04M 3/523* (2006.01)

(52) U.S. Cl. ............ 379/265.09; 370/356; 379/210.01; 379/900; 709/203; 709/206; 709/227

(58) Field of Classification Search ................ 370/352, 370/353, 356, 401; 379/209.01, 210.01, 379/265.09, 900, 218.01; 709/201, 203, 709/206, 227

See application file for complete search history.

(56) References Cited

U.S. PATENT DOCUMENTS

| 6,473,407 | B1 * | 10/2002 | Ditmer et al. ............... 370/252 |
| 6,490,620 | B1 * | 12/2002 | Ditmer et al. ............... 709/224 |
| 6,707,811 | B1 * | 3/2004 | Greenberg et al. ........... 370/352 |
| 6,760,429 | B1 * | 7/2004 | Hung et al. ............ 379/265.03 |
| 6,760,727 | B1 * | 7/2004 | Schroeder et al. ............ 707/10 |
| 6,829,348 | B1 * | 12/2004 | Schroeder et al. ..... 379/265.09 |

* cited by examiner

*Primary Examiner*—Harry S. Hong
(74) *Attorney, Agent, or Firm*—Hoffman, Warnick & D'Alessandro, LLC; Jerry W. Herndon (57) ABSTRACT

The present invention relates to method and system for providing online information in a networked user environment in which an end-user runs an application program and transmits data to an online server while running the application program. It is proposed to provide a request-button at the end-user application program dedicated to requesting information, and in particular help-information. When a help request is received at the communication server, a communication channel is promptly established between end-user and an agent. Information about the user activities sent in one or more transaction parts of an end-user intended business process and performed in the current application program session is read from the storage in the application server and is provided to the terminal of said agent in the help center. Advantageously, the same communication channel as used for performing the transactions is used for voice transmission for providing help or other information to the end-user.

10 Claims, 8 Drawing Sheets

METHOD OF ESTABLISHING A COMMUNICATION CHANNEL TO INTELLIGENT SUPPORT FOR EBUSINESS APPLICATIONS

BACKGROUND OF THE INVENTION

The present invention relates to method and system for providing online information in a networked user environment in which an end-user runs an application program and transmits data to an online server while running the application program.

The present invention has basically a scope which covers any kind of information to be provided to the above-mentioned end-user. It is, however, discussed with prior art documents in the field of online-help.

Figure 1:
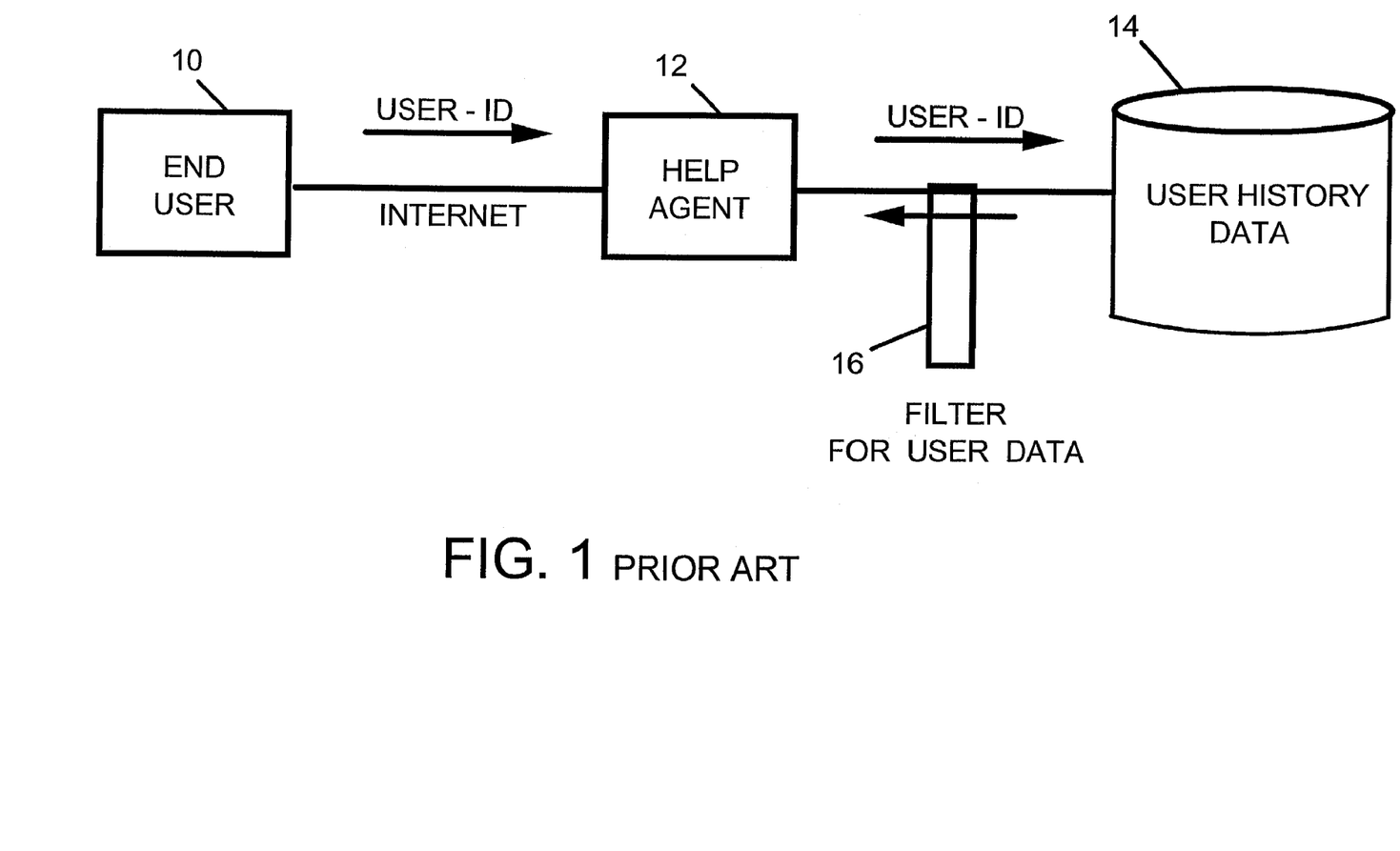
FIG. 1 is a schematic illustration of a prior art online-help provisio

Such a prior art technique for providing context-sensitive online-help is disclosed in U.S. Pat. No. 5,757,904. With reference to FIG. 1 said disclosure focuses the situation for the staff working in a call center and supporting clients symbolized as end-users 10 requesting information for an intended business process.

Said information may be of general nature, of course. In many cases, however, this will include some help information. Thus, help information is considered to be an exemplary type of information only, and is used in here to establish a definite example for setting out the differences between prior art and the present invention.

The end-user 10 is identified by a User-ID. The relevant data associated with his current session is stored in a database 14. Thus, the help agent 12 may access said database and read the user's session history data. Help information is requested and delivered via an online connection, e.g., via the Internet.

In said disclosure it is argued that the help agent 12 in the help desk center is confronted with too much information such that it is very difficult for said person to distinguish between more important and less important information. In order to make the job of the help agent more efficient, easy, and to allow it to be done with less skill and experience, said disclosure proposes to establish a form of information filter 16 which renders the important information for example in a highlighted form on the monitor of the help agent. Alternatively, unimportant information may be optionally totally suppress to the help agent.

From the help agents' point of view this may be a means for making his job simpler and more efficient. The disadvantage, however, is that the burden for the person 10 who is requesting help is still the same when said person has to describe the problem which he is actually confronted with and which is the reason for requesting help at the help agent.

Dependent of the actual business situation and application program in use—for example an online-provided JAVA-application—the end-user is obliged to tell the help agent 12 many details about the possibly multiple transactions he has already completed in order to give an accurate impression of the current status of work when talking to him.

This, however is a very burdensome task for the end-user because he is obliged to just repeat things which are already completed, or he is obliged to tell many details referring to his personal application environment, which represent detailed information the help agent is definitely required to know about in order to be able to appreciate the situation and the problems of a given end-user.

OBJECTIVES OF THE INVENTION

It is thus an objective of the present invention to provide a method and system which alleviate the above-mentioned burden for a person who requests information, and which improve the communication between said information-requesting person and the information delivering person or program, respectively.

SUMMARY OF THE INVENTION

The objective of the invention is achieved by the features stated in enclosed independent claims. Further advantageous arrangements and embodiments of the invention are set forth in the respective subclaims. Reference should now be made to the appended claims.

According to the broadest aspect of the present invention a method and respective system is presented for providing online information in a networked user environment in which an end-user runs an application program and transmits data to an online server while running said application program which is characterized by the steps of:

a.) providing an input means, for example an individual help button for signaling a help request to said server,
b.) receiving a help request from said end-user,
c.) establishing a communication channel coupling said end-user and a help agent according to said communication facilities, and
d.) providing history information transmitted during a current end-user application program session in one or more transactions of an intended business process to said help agent.

The latter step is done by reading said information from the location where it is currently stored—this can be a prior art storage in the application server—and providing it to a dedicated support program the help agent has in use.

It should be noted that the establishment of said communication channel might be done either with inclusion of the application server, or without, as a direct connection between help agent and end user, or the respective proxy-servers of them. In most cases, at least the user-associated minimum communication capabilities are known at the application server from the already effected communication when the help request was transferred.

Thus, information which is already filtered out and present at some place on any computer concerned in this scenario—the application server computer or the end-user computer or any kind of server—is efficiently used for a second, further purpose, namely to serve as an efficient information source for easily understanding the current problems which are the reason the end-user requests information, as e.g., help information.

When using this inventional feature the information-requesting client is not required to tell the above-mentioned context information to the help agent because this context information is already available to the help agent when help is requested. This is an efficient means for making the session contents more easily understandable to the help agent and for objectively documenting the underlying user problem.

When the inventional method further comprises the step of determining the possibly specific or possibly advanced hardware and/or software communication facilities that are available for use by said end-user, the communication between end-user and help agent can be selected accordingly such that both parties may benefit from the respective best communication technology ready for use.

When further the spontaneously established communication channel comprises voice transmission, the end-user and the help agent can talk with each other and solve the problem without writing any information. Thus, the help can be provided quickly and efficiently.

When further said voice transmission is realized via the same online connection which is used for the application program online connection, for example voice over Internet Protocol (voice over IP) then only a single connection line is required in total.

When further the inventional method comprises the additional, optional step of the help agent completing the intended business transaction after being authorized by the end-user, then the originally intended business process can be efficiently and quickly completed without a further interaction with the application program to be performed by the end-user.

When, further, the inventional method comprises the additional step of sending a context-sensitive help window derived by an evaluation of said already transmitted user transaction parts, the online-help can be performed without a conversation between end-user and help agent. This may be advantageous in certain easy-to-understand situations in which a conversation could be considered as too time-consuming in relation to the simplicity of the problem to be solved. In this case, standard help windows can be provided which reflect the solution of the problem the end-user was concerned with when issuing the help request.

When, further the inventional method comprises the additional optional step of recording all user activities of the current task in the application program in use, for example after having received an explicit user confirmation, then movements of the mouse pointer, mouse clicks and other user-performed actions may be transmitted to the help agent whereby the help agent is supplied with additional information for appreciating the business problem the end-user is confronted with. Such additional information might be located on the proxy server or on any web server in use. Thus, an efficient help can be provided by the help agent.

The respective steps of one of the above mentioned inventional methods may be implemented in a web browser program by providing a program means for storing information encoding said user activities at a proxy server, advantageously used by the end-user.

BRIEF DESCRIPTION OF THE DRAWINGS

The present invention is illustrated by way of example and is not limited by the drawings in which.

DETAILED DESCRIPTION OF THE PREFERRED EMBODIMENT

Figure 2:
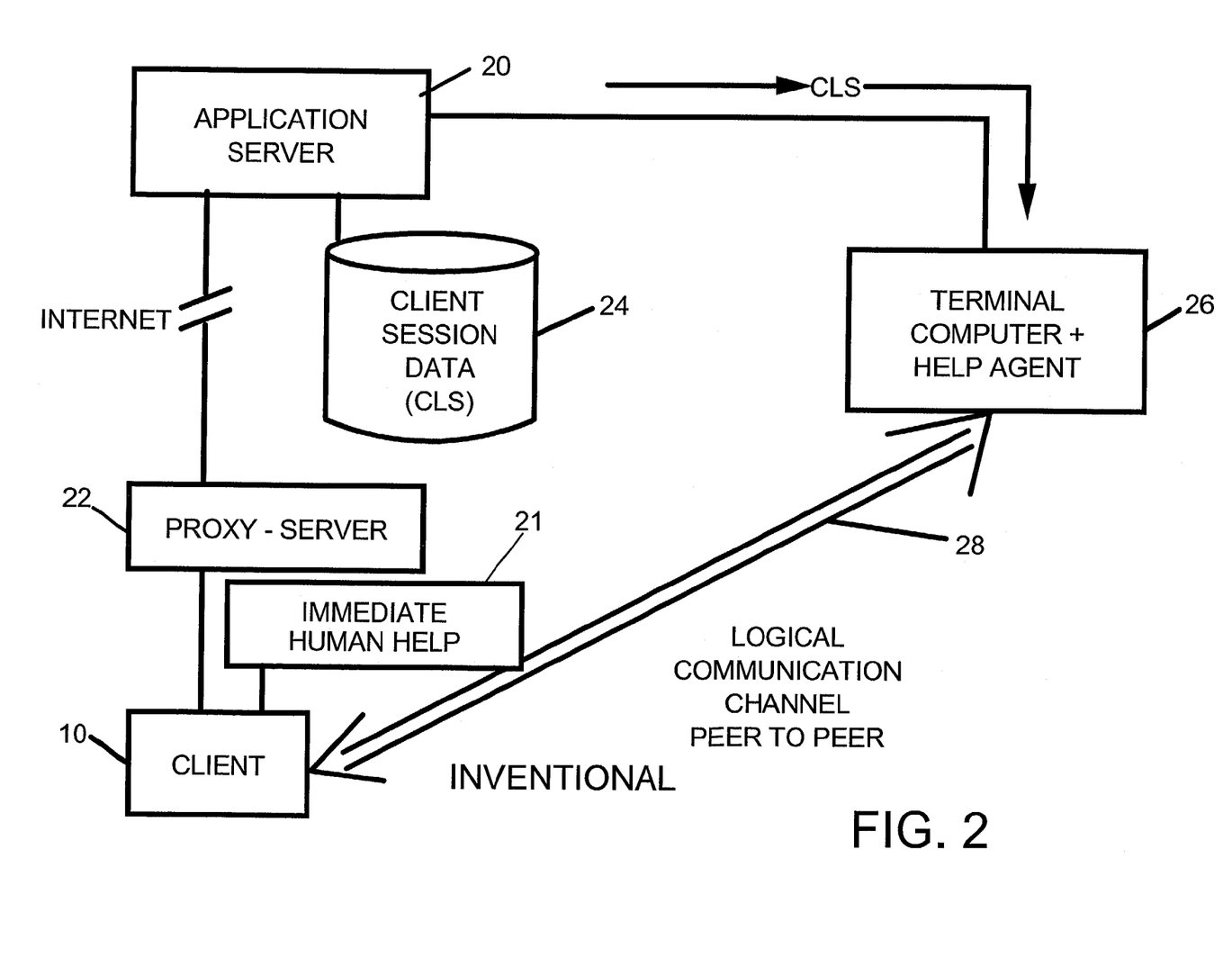
FIG. 2 is a schematic illustration of a situation in which the inventional concept of providing information is used.

With general reference to the figures and with special reference now to FIG. 2 a networked user environment is depicted. The network connection includes the use of the Internet in this example. Within a web session an end-user 10 runs a web application program from within his web browser and transmits session data via his own proxy-server 22 to a respective application server 20 while running the application program.

The session data is stored or updated, respectively, every time the user sends a respective web page filled in with his individual choice of data to the application server 20. The storage of session data is basically done at the application server 20 in a dedicated data storage 24, e.g., a database. Alternatively, session data can be stored elsewhere, for example at the Proxy-server 22 in a file system in a respective section for the client 10, or within applets at the computer of the client 10. The inventive concept is not limited to or dependent of any specific temporal storage location of session data for providing the session history to a help agent 26.

According to an inventional embodiment it is proposed to provide a request-button 21 at the end-user 10 application program dedicated and designed for requesting information, and in particular help-information.

When a help request is received at the application server 20 after the user 10 has pressed said help button 21, a communication channel 28 is promptly established between end-user and the respective agent 26 in a help center. This may or may not include the application server 20 or even the user-related proxy-server 22, as it is per se known from prior art telecommunications technology.

The above-mentioned session data represent the useful history information about the user activities that were transmitted in one or more single or multi-part transactions of the intended business process. Said session data from the current application program session is read from the storage 24 in the application server and is provided to the terminal 26 of said help agent 26 in the help center. Thus, this person can easily track the one or more transactions, may check the data filled into the respective forms and will quickly see in most cases the reason for the problem occurred to the client 10. Thus, the above-mentioned advantage of clear documentation of the user activities results.

When the established communication channel 28 comprises transmission of human voice, an individual help procedure can be supplied from person to person, avoiding too many formalities that are in turn known to be serious obstacles for completing quickly an intended business process. The voice transmission can be done as known in prior art, e.g., by a separate phone-based transmission or via "voice over IP", i.e., by using an IP connection for bidirectionally transmitting voice data.

Figure 3A:
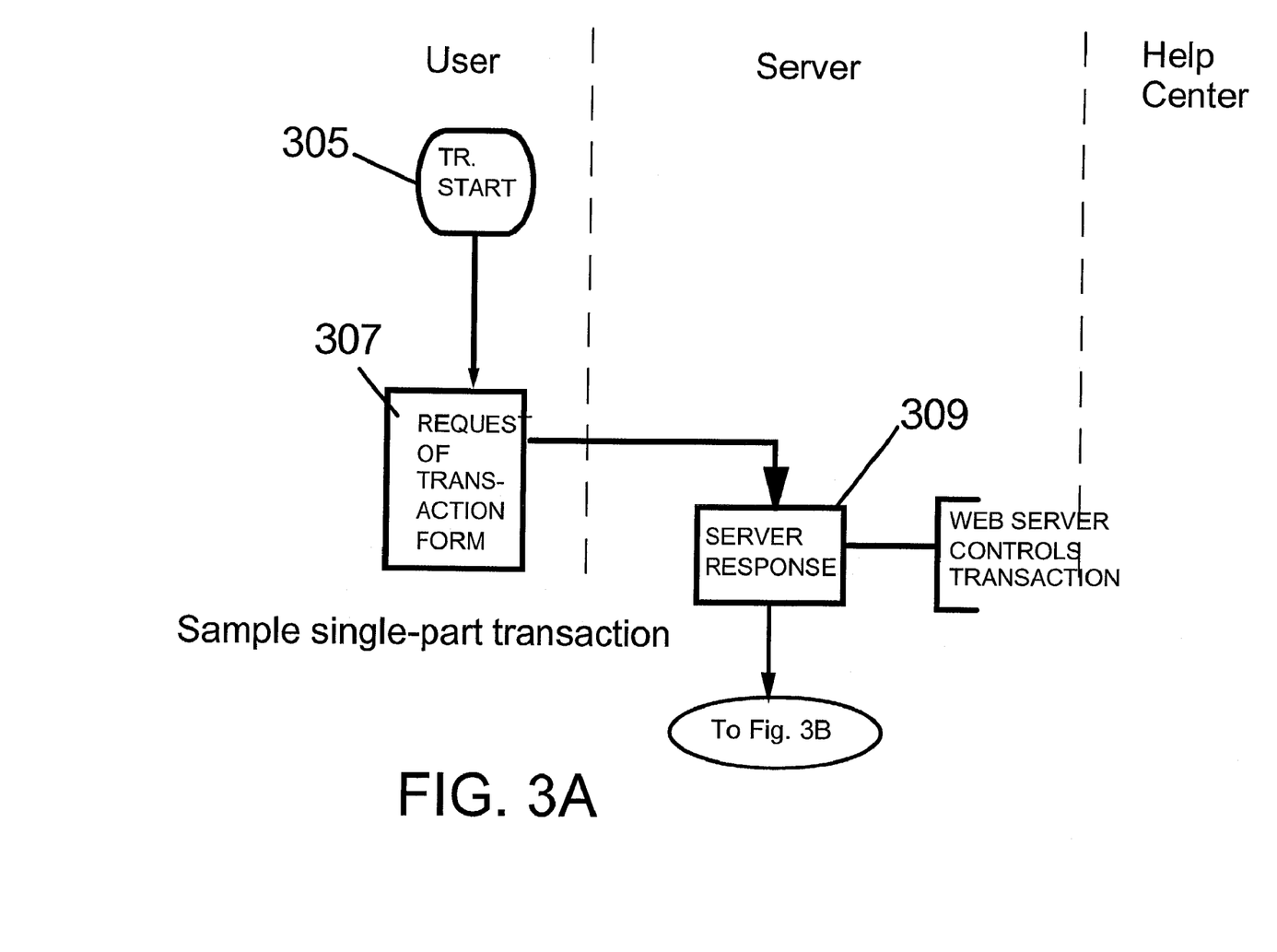
FIGS. 3A to 3C is a schematic illustration of the control flow according to an inventional embodiment in a single-part transaction in a situation depicted in FIG. 2.
Figure 3B:
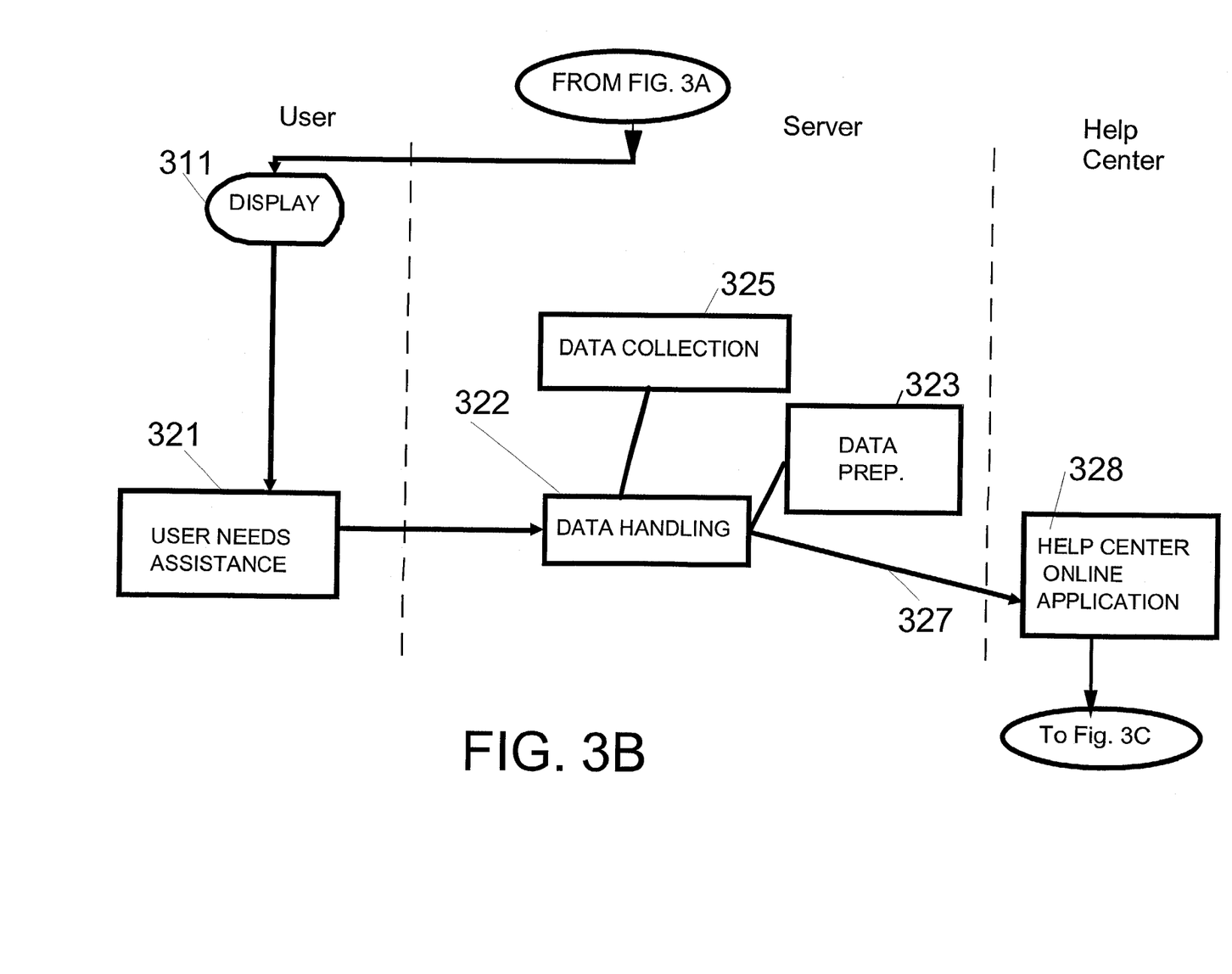
Figure 3C:
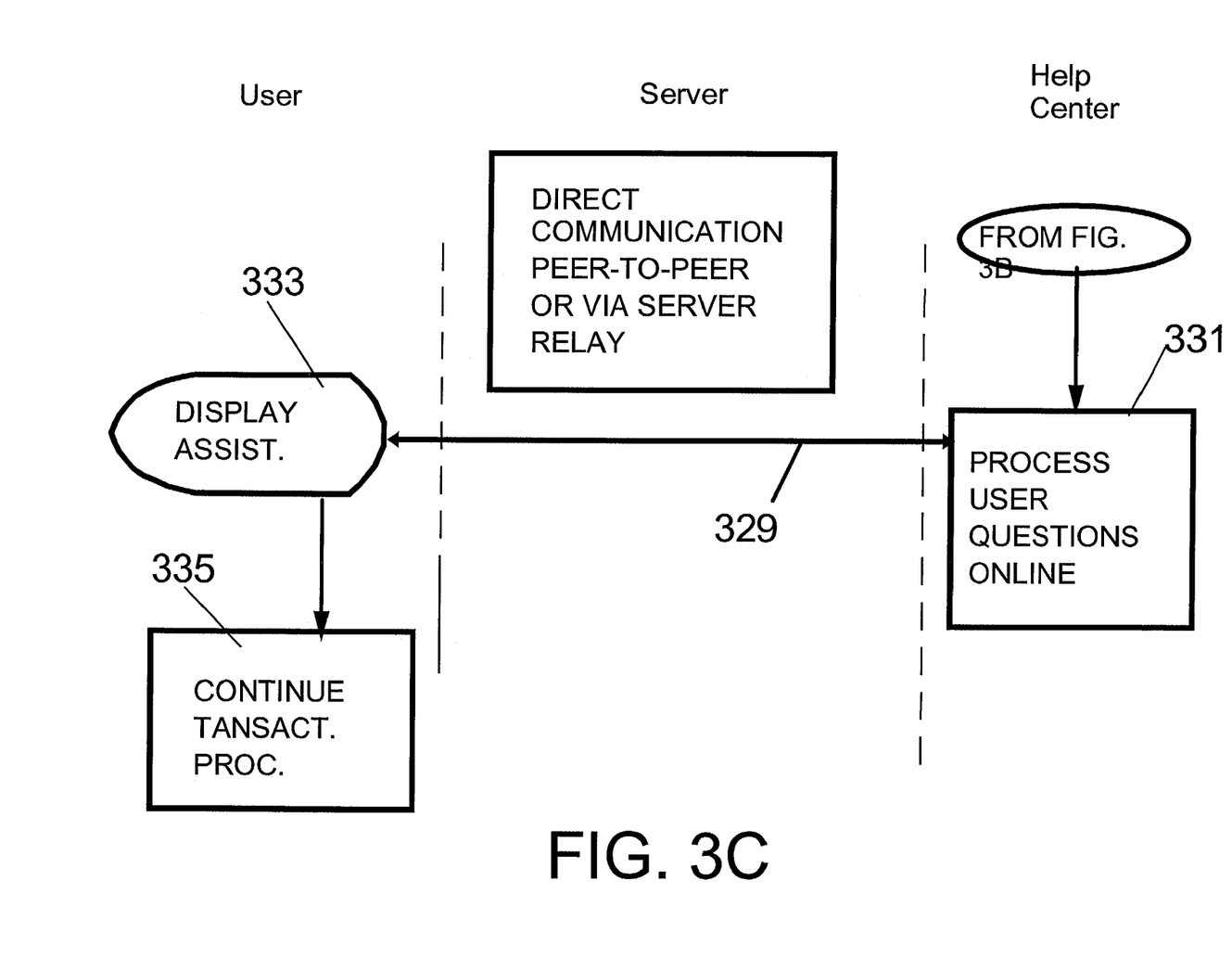

With reference to FIGS. 3A to 3C the control flow within a sample scenario featuring a single part transaction for buying a car is described in more detail when applying the method according to a preferred embodiment of the invention.

Hereto, the following preconditions and assumptions are made:

For the car dealer application:
  The car dealer offers a car configuration over the web. This is the business process implemented in the Internet application to be run from the application server 20, see back to FIG. 2.
  Said car configuration application is a "single page" application, i.e. the configuration is done on a single web page without communication to the server 20 while the configuration is not complete and approved by the dealer's customer, i.e., the client 10.
  The application features functionality in the car configuration section, where a user may ask for instant help from a human person because of any reason. Requesting this support, e.g., by pressing a "Human Help"-titled button, automatically transfers the current data filled in by the user to the application server.

The application server features a functionality which establishes an instant communication to a help desk, i.e., a staffed help center having a desktop environment networked to the application server, and transfers the already filled-in data to the respective center.

The application establishes the communication channel depending on the scenario sublevel mentioned below between the user 10 and the help desk 26.

Scenario 1A: the application server 20 serves as a relay station and transfers data from the help desk 26 to a web page on the user's 10 computing device. The user input comprising the client session data (CLS) is transferred from standard web page to the help desk 26 via the application server 20.

Scenario 1B: An instant messaging channel 28 is established between the user 10 and the help desk 26. The conversation may or may not be relayed by the application server 20.

Scenario 1C: A voice-over-IP connection is established between user 10 and help desk 26.

For the user, i.e., the car dealer's customer environment:

The user is running a prior art web browser. The web browser may be a standard browser without any extensions, scenario 1A, or may have a special plug-in for instant messaging, scenario 1B), or may have a special plug-in for Voice-over-IP, scenario 1C) or may have another communication channel capability not explicitly covered in this sample.

For the help desk 26:

A respective Help desk application program features functionality to receive the data the user has already filled. Preferably, the capability is implemented to modify and send the data back to the user's web page.

The Help desk features devices and software to serve the different communication channels mentioned for scenario 1A, 1B or 1C.

In FIGS. 3A to 3D three columns of activities are depicted. The left one comprises activities done by the user 10, the central one comprises activities done by the application server 20, and the right one comprises activities done by the Help center 26. Arrows connecting respective activities indicate the target, i.e. the object of an activity.

Having made these assumptions a sample control flow for the above mentioned single part scenario for car ordering and order configuration comprises the following:

The user 10 starts the car order by calling the dealer's web page, steps 305, 307. In response to this, the dealer's application server sends the requested transaction page for configuring the car, step 309. The requested page including the various configuration capabilities is displayed to the user, step 311, FIG. 3B. The user 10 selects his individual options and fills in some data into the form.

It should be assumed that the configuration procedure is quite complex, that he feels lost and needs assistance. Thus, he decides to press the above-mentioned "Human help"-button provided in the application's form. A typical reason for this may be that a specific car configuration feature is not available in combination with other features, or another feature is a prerequisite for a different further feature: For example, it might be the situation that the interior color 'green' is not available with a car body color 'white'.

The user 10, however, does not realize these dependencies and needs assistance. Now the user clicks on the "Human Help" button, step 321.

According to this preferred embodiment the inventional handling 322 of user data for the current transaction form aims to initiate promptly the assistance of a staff member 26 in the help desk center. In order to do that, the user request is received comprising the already filled-in user data specifying the difficult car configuration case. This is prepared for transportation to the help center 26. This may include some data formatting work dependent of the type of storage actually in use, step 323.

Further, user environment configuration data regarding the communication capabilities of the User 10 PC—or any other portable device in use—are either collected from a respective storage area in the server 20 if already present for the application, or it is queried by the application server, step 325, and is evaluated at the application server 20. It shall be assumed that the evaluation yields a result that leads to one of the scenarios 1A, 1B, or 1C, as mentioned above.

Then, the already filled-in user data and the communication capability data are transferred to the help center application arrow—327—.

Depending on an evaluation of the communication capability data the help center application establishes a connection to the user 10, for example, by using the application server 20 as a relay or directly excluding the application server 20. Thus, a respective one of the above sub-scenarios 1A, 1B, or 1C occurs, step 329, FIG. 3C.

In subscenario 1A) the server 20 serves as a relay station between the help desk and user, for example in a case which there is only a single connection line available for the user 10, and no instant messaging feature or "Voice over IP"-feature is installed in the web browser of the client 10. Thus, a help window may be implemented to pop up at the client 10 computer disclosing a solution of the underlying car configuration problem quickly drafted by the help desk staff member after having read through the user's session data, step 333.

In subscenario 1B) the server 20 is excluded and an instant messaging channel is established between help desk 26 and user 10, for example in a case in which such instant messaging feature is installed in the web browser of the client 10. Then, a respective quick conversation can be performed in a written form including displaying help to the user, step 333.

In subscenario 1C) a "voice over IP"—connection is established directly between user 10 or his Proxy-server 22, respectively, and the help desk 26. Thus, the help assistance 333 is oral and quickly to be performed, possibly over a single physical connection line when this line is shared between the application program and the help desk 26.

When using one of the three communication channels 1A), 1B), or 1C) the user may ask his questions in a non-formal manner and the help-desk clerk at the desktop computer 26 may reply immediately and may solve the problem very quickly, step 331, because he is already informed about the problem by shortly inspecting the client session data (CLS) transferred to him at step 327, above.

Whenever it should be desired and after approval by the user the help-desk clerk may even modify or complete the transactional data in lieu of the user 10 and send it back to the user for final control and approval.

Finally, in step 335 the user continues the transaction processing, commits the order and finishes all open communication threads.

With additional reference to FIGS. 4A to 4D a schematic illustration of the control flow according to further inventional embodiment in a multi-part transaction in a situation depicted in FIG. 2 will be described.

Figure 4A:
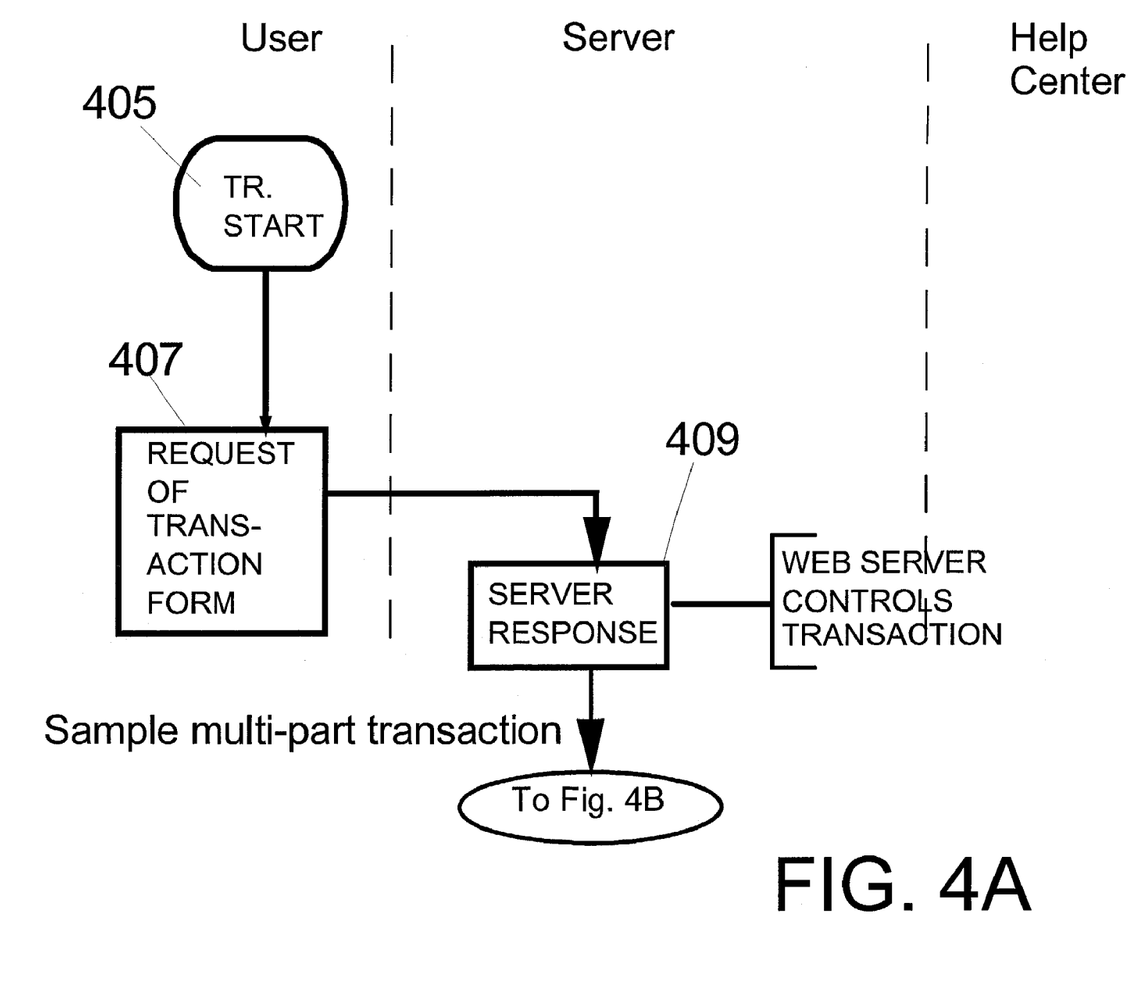
FIGS. 4A to 4C is a schematic illustration according to FIGS. 3A to 3C in a multi-part transaction.

A multi-part transaction is understood in here as a transaction that comprises several—more than one—confirmations of the user, each confirmation resulting in a separate set of user data to be stored at the application and specifying a given part of the car configuration. For example, one part may cover the interior features, a different part may cover the motor technical features, and a further part may cover any other additional car configuration extra detail.

The basic flow of control is the same as the one described with reference to FIGS. 3A to 3D. Thus, just a reference to steps 305 to 311 is given for the description of steps 405 to 411, and a reference to steps 327 to 335 is given for the description of steps 427 to 435.

Thus, the situation is as follows:

For example, the multi-part transaction comprises 5 parts. The plurality of transaction parts is assumed to be implemented in the application program by means of a respective loop. Each new loop run covers a respective new form in which new car configuration data has to be filled-in by the user. According to FIG. 4B in each loop run, after display, step 411, and having filled in the respective data, step 413, each form is sent to the application server 20 where the respective data is processed, step 415. Said data is particularly stored, step 417, until the overall transaction has been finished, e.g., by completion or by canceling the car order as such.

Figure 4B:
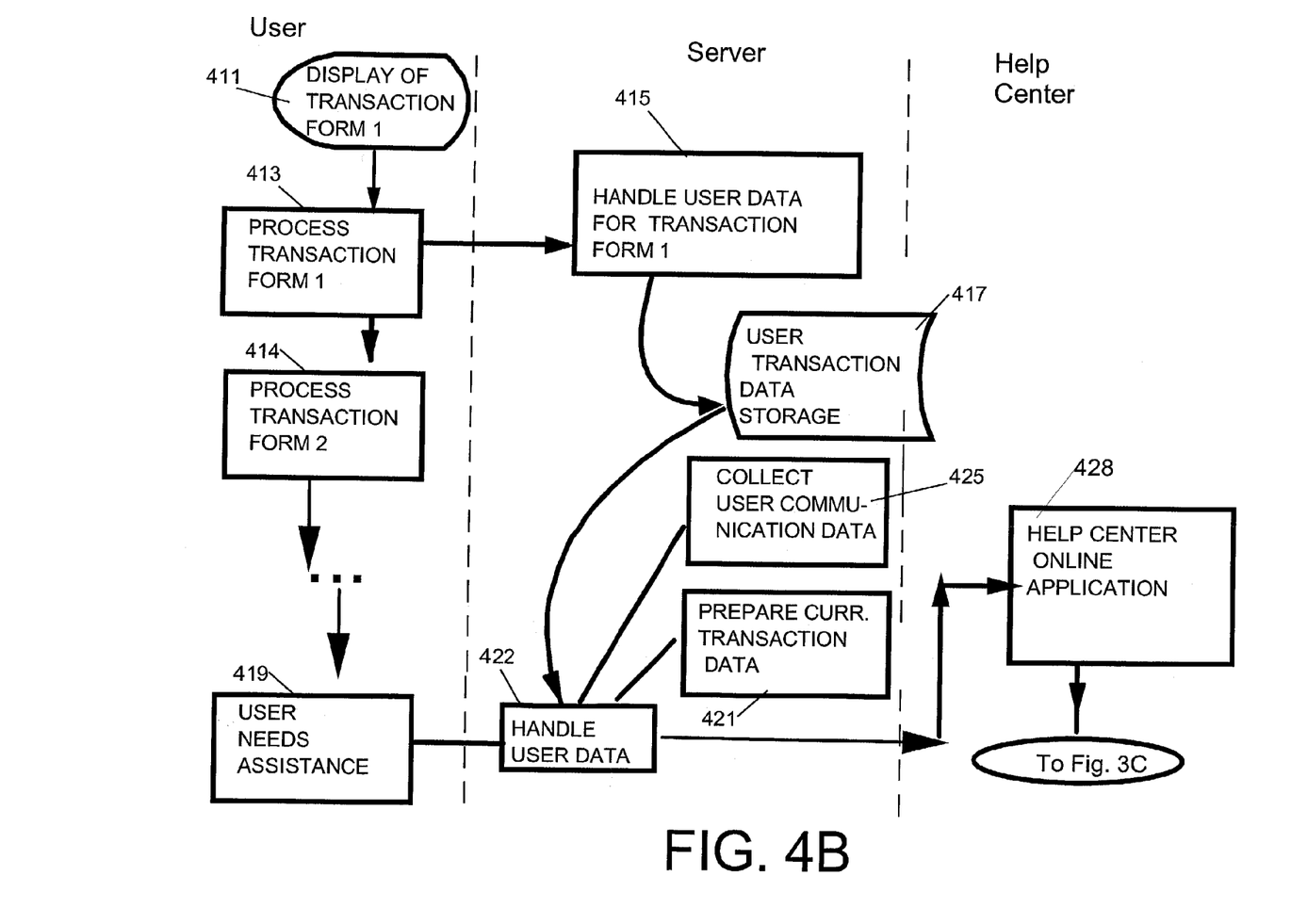

Thus, the user 10 is assumed to fill-in data for part 1, step 413, and part 2, step 414, and to commit both transactions #1, and #2. When reading form #3 a problem occurs and he needs assistance, step 419, and presses the "Human-Help" button.

Thus, when the help request is received at the application server, all data originating from transaction parts #1 and #2 is collected from the local storage, step 421, and the data is transported to the help center 26 as described above, see FIG. 4C.

Figure 4C:
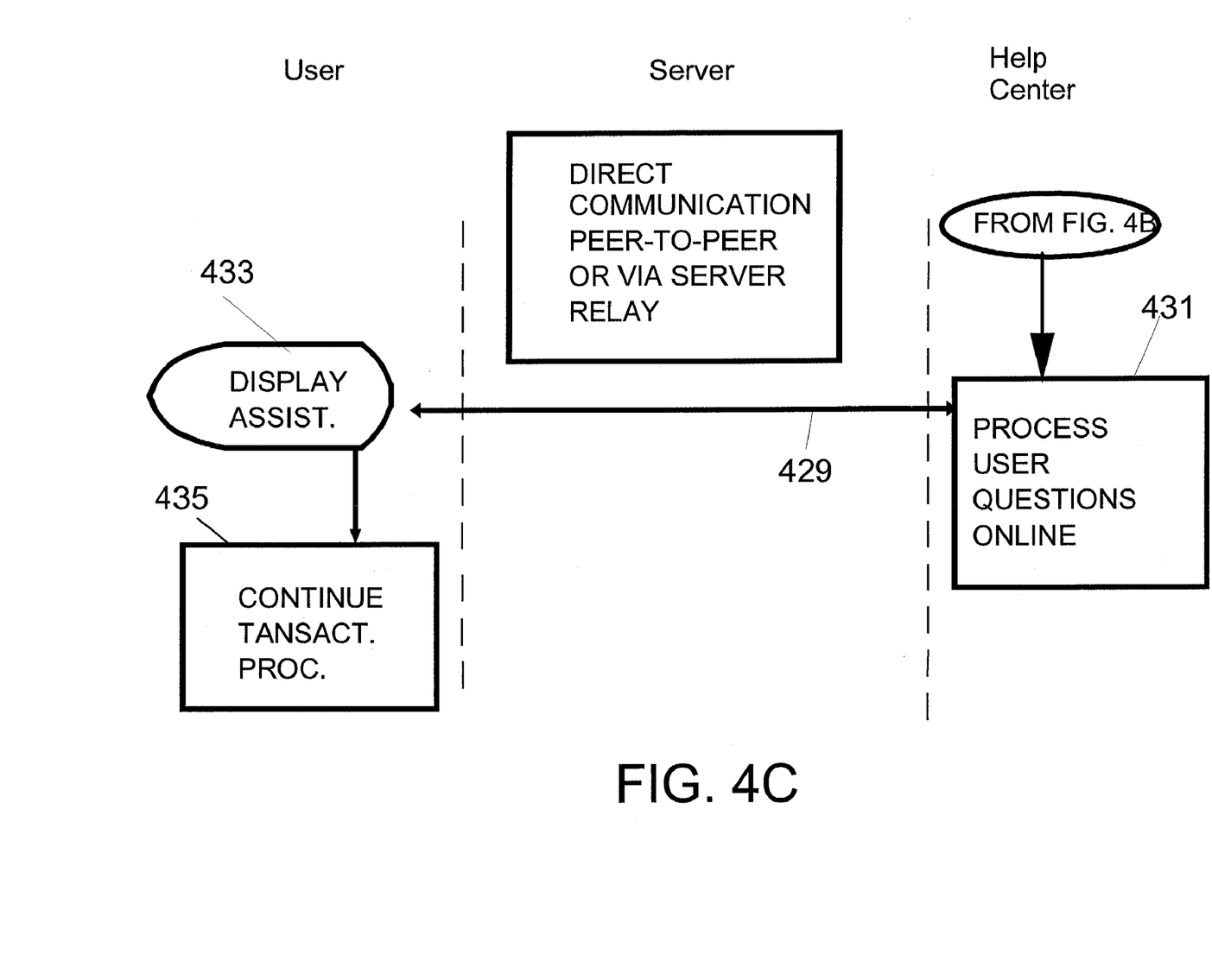

The communication capability data is processed in the same way as discussed above, step 425.

Thus, the plurality of data sets #1 and #2 and #3 are combined for a complete data set which is transferred to the help center application together with the communication capabilities data, step 427. Thus, the help agent may have a synopsis view at the different sets of data and will be able in most cases to recognize the underlying problem, e.g., by issuing the display of help information, step 433, FIG. 3C. The same communication channel 28 may thus be established, step 429, as described above. Thus, the remaining transaction forms can be filled-in after problem solution, step 435, whereby the help procedure can be repeated with different forms. Thus, a multi-part transaction can also be covered by the inventional, immediate 'human help' concept disclosed above.

The present invention can be realized in hardware, software, or a combination of hardware and software. A tool according to the present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software could be a general-purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods.

Computer program means or computer program in the present context mean any expression, in any language, code or notation, of a set of instructions intended to cause a system having an information processing capability to perform a particular function either directly or after either or both of the following a) conversion to another language, code or notation;

b) reproduction in a different material form.

The invention claimed is:

1. A method for providing online information in a networked user environment in which an end-user runs an application program and transmits data to an online-server over an online connection while running the application program, the method being characterized by the steps of
   a.) providing a user input means for signaling a request to said server;
   b.) receiving a request from said end-user;
   c.) establishing a communication channel between said end-user and an agent according to the communication facilities associated with the end-user; and
   d.) providing history information about the user activities transmitted in one or more transaction parts of an intended business process in the current application program session to a terminal of said agent or to input means of a dedicated support program,
   wherein the data is adapted to be periodically transmitted to the server prior to the signaling of the request to the server.

2. The method according to claim 1, further comprising the step of: determining communication facilities available for use by said end-user.

3. The method according to claim 1, in which the communication channel comprises voice transmission.

4. The method according to claim 3 in which the voice transmission is performed via the online connection already in use by the application program of the end-user.

5. The method according to claim 1, further comprising the step of completing the business process intended by the end-user by an action initiated by the help agent or the support program after confirmation by the end-user.

6. The method according to claim 1, further comprising the step of sending a context-sensitive help window derived by an evaluation of said already transmitted user transaction part.

7. The method according to claim 1, further comprising the step of after-user confirmation recording additional user activities of the current task on an online server accessible to the agent or the support program.

8. A computer system having means for performing the steps of a method according to one of the preceding claims 1 to 7.

9. A computer program for execution in a data processing system comprising computer program code portions for performing respective steps of the method according to anyone of the preceding claims 1 to 7, when said computer program code portions are executed on a computer.

10. A computer program product stored on a computer usable medium comprising computer readable program means for causing a computer to perform the method of anyone of the claims 1 to 7, when said computer program product is executed on a computer.

* * * * *